H. S. GRACE.
VEHICLE WHEEL.
APPLICATION FILED APR. 16, 1910.
1,042,214.
Patented Oct. 22, 1912.
2 SHEETS—SHEET 2.
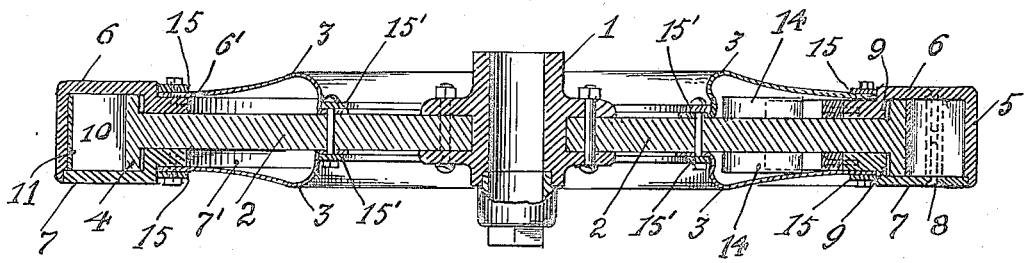
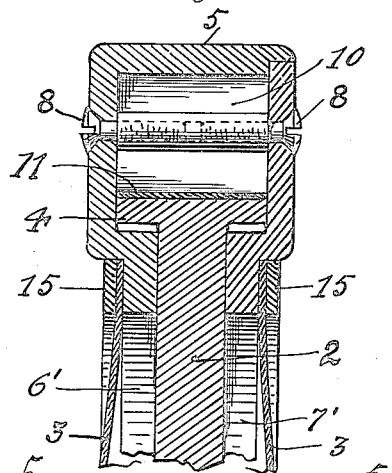
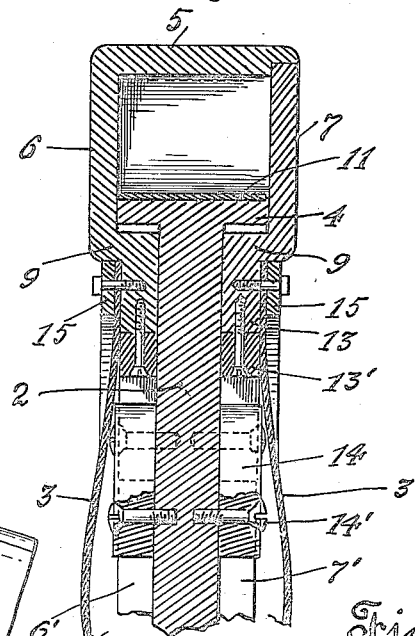
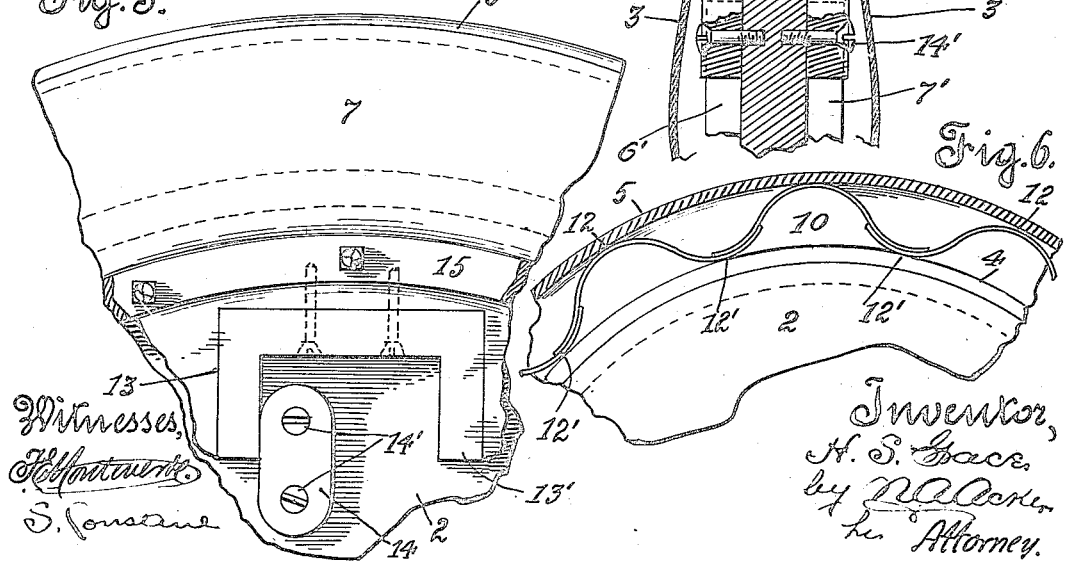

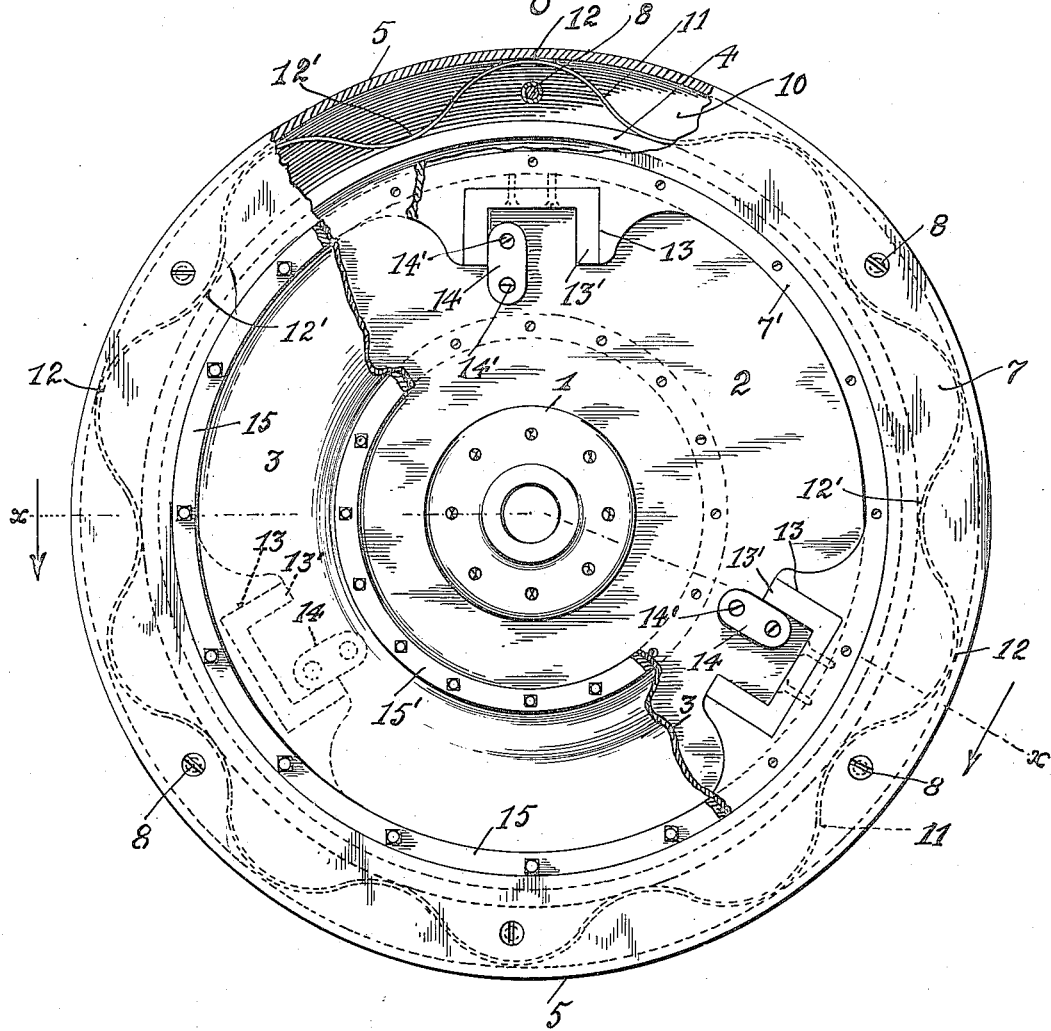

UNITED STATES PATENT OFFICE.

HENRY S. GRACE, OF SAN FRANCISCO, CALIFORNIA.

VEHICLE-WHEEL.

1,042,214. Specification of Letters Patent. Patented Oct. 22, 1912.

Application filed April 16, 1910. Serial No. 555,858.

*To all whom it may concern:*

Be it known that I, HENRY S. GRACE, a citizen of the United States, residing in the city and county of San Francisco and State of California, have invented certain new and useful Improvements in Vehicle-Wheels, of which the following is a specification.

The hereinafter described invention relates to vehicle wheels of the resilient type, adapted for use in connection with automobiles and motor driven vehicles generally, and the object of the invention is to dispense with the employment of the expensive pneumatic tires commonly utilized in conjunction with the wheel equipment of automobiles, and it more particularly has for its object the production of a wheel simple and effective in its construction, which can be easily and cheaply manufactured, and which effectively serves the purposes demanded of a wheel for automobiles.

To comprehend the invention, reference should be had to the accompanying sheets of drawings, wherein—

Figure 1 is a broken side elevation of the improved vehicle wheel. Fig. 2 is a longitudinal sectional view taken on the line $x$—$x$, Fig. 1 of the drawings. Fig. 3 is an enlarged detail sectional view of the wheel rim and a portion of the web on which the same is slidably mounted. Fig. 4 is a similar view illustrating one of the wear bushings secured to the wheel rim, the driving block attached to the wheel web for engaging the bushing, and the flexible dust guards for preventing the admission of dust and dirt within the joint formed between the wheel rim and the web. Fig. 5 is an enlarged side view of the features disclosed by Fig. 4 of the drawings, the flexible dust guard being removed. Fig. 6 is a broken longitudinal section of the wheel rim, illustrating a modified construction of the continuous shock consuming spring interposed between the outer rim and the wheel web.

In the drawings, the numeral 1 is used to indicate any suitable form of a hub, from which springs or projects a circular web 2. The said web is formed with a flat circular rim 4, which rim is inclosed or embraced by the outer vertically slidable rim of the wheel.

The outer rim 5 consists of a circular tread, and the depending side walls 6 and 7, the wall 6 being formed integral therewith, while the wall 7 is separate therefrom and united to the wall 6 by means of a series of bolts 8. Each of said walls is inwardly flanged to form a shoulder 9, which, when the wheel rim is held outwardly its full distance, abut against the under face of the rim 4 of the web 2, while the downwardly extended portions or continuations 6' and 7' of the walls 6 and 7 respectively, bear against the outer faces of the web 2, Fig. 4 of the drawings. Under this construction, the outer rim is provided with an annular pocket or channel 10, access to which may be had, when the same is fitted to the wheel structure, by a removal of the detachable wall or face plate 7.

Within the annular pocket or channel 10 of the outer rim is fitted a continuous supporting metallic spring 11, of serpentine or corrugated form, which spring is of sufficient stiffness or rigidity to hold outwardly the rim of the wheel under normal conditions when applied to a car, but will give to shocks falling onto the wheel rim when the car is in operation.

The alternating ridges 12 and 12' of the continuous supporting spring 10 bear respectively against the under face of the outer rim and the outer face of the rim 4 of the web 2, thus giving a series of alternating bearings throughout the length of the continuous supporting spring. This continuous supporting spring for the wheel rim may be formed as an integral structure, or built up of a series of overlapping sections, as disclosed by Fig. 6 of the drawings, but in whatever form it may be constructed, the term continuous as applied thereto is intended to cover a corrugated or serpentine spring by means of which shocks are consumed and distributed throughout the length thereof, the spring having a series of bearing points which alternately act against the rim of the supporting web and the outer rim slidably held thereto.

The depending walls or side plates 6 and 7 are formed with a series of circumferentially disposed seats 13, in each of which is fitted a bushing 13', which bushings are acted against by means of the drivers 14, secured to each face of the web 2. These drivers are secured together and held against a turning action by a pair of bolts 14', secured to the web 2, Figs. 1, 4 and 5 of the drawings.

To exclude dust and dirt from the movable parts, a rubber disk or diaphragm 3 is secured to each wall or side plate 6 and 7 by means of a clamp ring 15 bolted thereto, the lower edge of the said disk or diaphragm being held to each face of the web 2 by the clamp rings 15' bolted thereto. These rubber disks or diaphragms completely cover and hide from view the working joint and prevent the access of dust and dirt thereto.

The outer rim of the wheel is sustained and held a distance away from the rim of the web 2 solely by the stiffness or resistance offered by the continuous spring 10, so that as the tension thereof is overcome the rim will give at such point of contact to the strain placed thereon and move inwardly in accordance with the degree of pressure placed thereon, the distortion of the spring permitting of such action. However, by reason of the depending side walls 6 and 7, which act as guides against the faces of the web 2, the outer rim is held against lateral displacement.

As rotation is imparted to the hub 1 and web 2, the tendency of the same is to turn from the slidable outer rim, and such would be the result were it not for the drivers 14. However, these drivers engage the bushings 13', and by so doing impart rotation to the outer rim by holding the same at such time in locked engagement with the web of the wheel.

The bushings 13' are merely employed to take up the wear which would otherwise result to the seats 13, hence the said bushings may be considered and treated as mere removable wear linings for the seats 13.

To obtain access to the annular pocket or channel 10 of the wheel rim for insertion of a spring or other purposes, it is only required to disconnect the face plate 7.

A metallic tired automobile wheel is thus produced, which possesses sufficient elastic or resilient properties to enable the same to be successfully employed in place of the expensive pneumatic tires utilized, and, by reason of the metallic non-puncturable tread, presenting a wheel possessing a longer life and usefulness than that of a pneumatic tire, while at the same time the expense of the tire is materially less as to initial cost than those at present in use and its maintenance reduced to a minimum.

Having thus described the invention what is claimed as new and desired to be protected by Letters Patent is:—

1. A wheel for motor driven vehicles, the same comprising a hub part, an annular rim, a connecting web member, the hub, web and rim being of integral metallic formation, and the rim projecting beyond opposite sides of the web, a separable outer rim member spaced from the first mentioned rim member, a spring resting upon the relatively wide periphery of the first mentioned rim and adapted to engage the outer rim member, side flanges depending from the edges of the outer rim member and overlying said spring, and said side flanges having a laterally offset part extending under the first mentioned rim and engaging the connecting web, and the said depending side flanges of the outer rim also having open ended slotted ways extending from the inner edges of the side flanges inwardly, and driver members extending from opposite sides of the web and adapted to loosely fit within the slotted portion of said side flanges.

2. A wheel for motor driven vehicles, the same comprising a hub part, an annular rim, a connecting web member, the hub, web and rim being of integral metallic formation, and the rim projecting beyond opposite sides of the web, a separable outer rim member spaced from the first mentioned rim member, a spring resting upon the relatively wide periphery of the first mentioned rim and adapted to engage the outer rim member, side flanges depending from the edges of the outer rim member and overlying said spring, and said side flanges having a laterally offset part extending under the first mentioned rim and engaging the connecting web, and the said depending side flanges of the outer rim also having slotted ways open at the inner edge of said flanges and driver members substantially rectangular in shape carried by the web member one for each of said slotted ways, substantially as and for the purpose described.

In testimony whereof I have signed my name to this specification in the presence of two subscribing witnesses.

HENRY S. GRACE.

Witnesses:
N. A. ACKER,
W. A. HENRY.